UNITED STATES PATENT OFFICE.

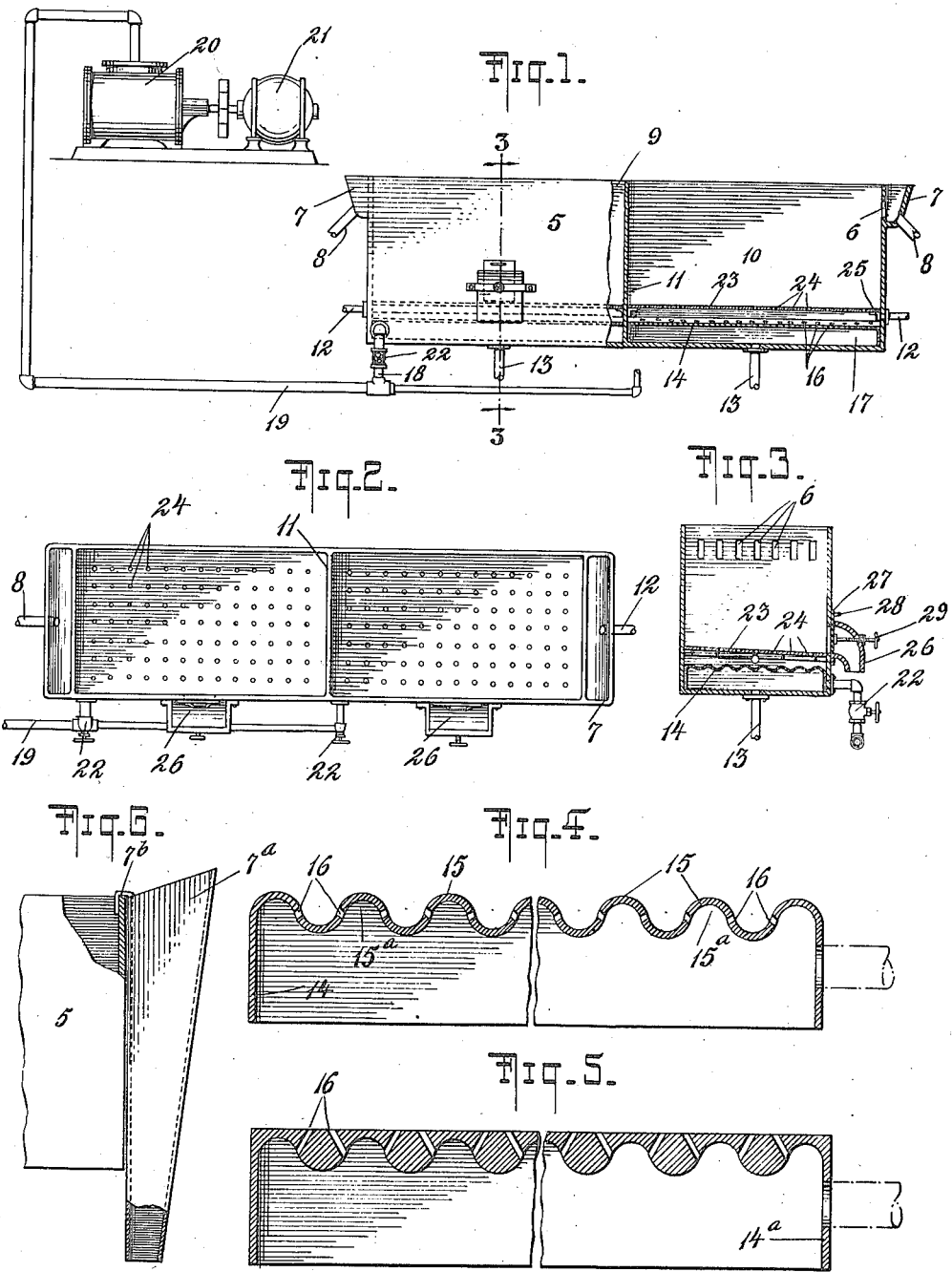

GEORGE B. FURMAN, OF EAST ORANGE, NEW JERSEY.

APPARATUS FOR TREATING FOOD STUFFS AND THE LIKE.

1,190,638.　　　　Specification of Letters Patent.　　Patented July 11, 1916.

Application filed July 17, 1914. Serial No. 851,464.

*To all whom it may concern:*

Be it known that I, GEORGE B. FURMAN, a citizen of the United States, and resident of East Orange, county of Essex, State of New Jersey, have invented certain new and useful Improvements in Apparatus for Treating Food Stuffs and the like, of which the following is a specification.

My invention relates to apparatus for treating food stuffs and the like such as oysters, clams, vegetables, fruits, etc., for the purpose of improving the condition thereof prior to use. Heretofore attempts have been made to treat and wash such food stuffs by placing them in tanks or other containers and then permitting running water to flow into said containers and occasionally stirring the food stuffs with a paddle or rinsing them by hand. Such treatment is ineffective to reach the more or less inaccessible parts of the material being treated, such as the gills of oysters and the like, the spaces at the points at which the leaves of vegetables such as spinach join the stalks, the eyes of potatoes or the recesses of apples and similar fruits in which the stems are located and results in a mere superficial treatment which only partly washes and cleans the material as will be readily apparent. The particular object of my invention is to overcome these objections by placing the oysters, vegetables, fruits and the like in a receptacle containing water or other liquid and forcing air under pressure through said water. In this manner the material is floated and tumbled about and the air rising through the liquid impacts against the material and spreads apart the elements thereof so as to open up the usually inaccessible points and permits the same to be readily washed free from foreign matter. In the case of vegetables such as potatoes, or fruits such as apples the washing action extends into the remotest parts of the eyes or recesses thereof so that in all cases a thorough and efficient washing and cleaning results in a simple and efficient manner.

My improvement will be fully described hereinafter and the features of novelty will be pointed out in the appended claims.

Reference is to be had to the accompanying drawings in which—

Figure 1 is an elevation, partly in section, of an example of my improved apparatus; Fig. 2 is a plan view thereof; Fig. 3 is a cross-section on the line 3—3 of Fig. 2; Fig. 4 is a detail section of a part of my apparatus; Fig. 5 is a detail sectional view of a slightly different form of said part of my improvement, and Fig. 6 is a detail elevation partly in section of a slightly different form of overflow trough.

As shown in the drawings my improved apparatus comprises a tank 5 of any suitable construction and dimensions adapted to contain water and provided at the upper portions of its opposite end walls with overflow openings 6 communicating with overflow troughs 7 or the like suitably secured on said end walls and having outlets 8 as clearly illustrated in Fig. 1. The tank 5 in the illustration is divided into two compartments 9 and 10 by means of a water-tight partition 11 and is further provided with inlets 12 through which the water may be introduced into the compartments 9 and 10 and with outlets 13 through which the water may be drained therefrom. Air compression chambers 14 are located at or near the bottom of the compartments 9 and 10 and are of a size to readily fit into said compartments and so as to be easily removable therefrom for the purpose to be more fully described hereinafter. The said chambers 14 if rectangular as illustrated are provided with four upright walls which together form a continuous and endless wall and in any case of whatever shape said chambers may be they are provided with a continuous and endless side wall with which the transverse major wall is connected or of which said major wall forms an integral continuation. In the preferred form the horizontal or major walls of said chambers 14 are corrugated as indicated at 15 and are provided with perforations 16 preferably though not necessarily located at the sides or in other words in the more or less upwardly extending portions of the corrugations, so as to extend toward each other in adjacent rows as clearly illustrated in Fig. 3. The said chambers 14 when in operative position thus form spaces or chambers 17 at the bottom of each compartment 9 and 10 inclosed by the continuous and endless side walls of the chambers 14 and connected by means of branch pipes 18 with a main pipe 19 leading to an air pump 20 or the like the latter being actuated in any suitable manner as by means of an electric motor 21. The pipes 18 may be provided with controlling valves 22 and extend through the walls of the tank 5 and have their inner ends connected with the chambers 14 in an easily detachable manner and so as to communicate with the chambers 17. Flat plates 23 provided with perforations 24 or other foraminated elements are removably supported in the compartments 9 and 10 at a distance above the chambers 14 on angle irons 25 secured to the walls of the tank 5 and the partition 11 and preferably incline downward toward removal openings in the front wall of said tank 5 communicating with downwardly directed spouts 26, said openings being normally closed by means of vertically sliding doors 27 having actuating handles 28 and being locked in water-tight engagement with said tank over said openings in any suitable manner as by screws 29 passing through the spouts 26 and adapted to firmly press said doors against said tank.

In operation the compartments 9 and 10 of the tank 5 are first partly filled with water after which a supply of vegetables, fruits, oysters, clams or the like previously removed from the shells are placed therein and gradually settle down upon the plate 23. By means of the air pump or the like 20 air is now forced through the pipes 18 and 19 into the inclosed spaces or chambers 17 and beneath the major walls of the chambers 14. This air fills said spaces including the concavities 15ᵃ formed by the corrugations 15 which concavities form reservoirs for said air and thus provide for the equal distribution thereof at all of the perforations 16. As the chambers 17 are thus filled with air the water therein is forced out and the air finally escapes through the perforations 16 and rises through the perforations 24 of the plates 23 and passes through the water in the compartments 9 and 10. The water in this manner is disturbed by a plurality of currents of air which may intersect each other if the perforations 16 in adjacent parallel rows project toward each other so that all parts of the supply of water in the compartments 9 and 10 are affected by and subjected to the action of said air currents. In passing the air through the water as described the oysters or the like are floated and tumbled about by the air and the agitation of the water caused thereby so that the muscles and gills of said oysters or the like are liberated and freed. In consequence of this the oysters or the like freely drink or take in water thus increasing in size and weight in a minimum of time and as the water is fresh and selected with a view to purity this operation is a healthful one instead of an injurious process as is at present very often the case. At the same time all dirt, slime, refuse, shell and other foreign matter is removed from the oysters or the like so that said oysters or the like are subjected to a thorough cleaning process which removes all foreign matter having a tendency to readily decompose and thus brings said oysters or the like to a condition of cleanliness which permits the preservation thereof in a healthy state for a much longer period of time than is possible under conditions existing heretofore. The oysters are also not roughened up, torn or otherwise mutilated in the present treatment but maintain their natural smooth surface condition, thus increasing their salability and palatability. When the above treatment has been carried on for the desired length of time the air supply to the chambers 17 is shut off by means of the valves 22 and the water is withdrawn or drained from the compartments 9 and 10 through the drain pipes 13. This causes the treated oysters or the like to again settle down upon the plate 23 from which they readily pass through the openings and out of the spouts 26 into suitable receptacles it being understood that the doors 27 have first been opened to permit this removal. As the plates 23 preferably incline downwardly toward said openings and spouts 26 the treated oysters or the like naturally slide toward the same thus making the removal thereof a simple and easy matter. During this process or operation the light dirt or other foreign matter removed from the oysters or the like floats and is free to pass through the apertures 6 into the overflow troughs 7 while the slime and heavier foreign matter or refuse sinks through the perforations 24 and finally deposits itself in the depressions between the corrugations 15. These corrugations are capable of accommodating a considerable amount of foreign matter without interference with the perforations 16 or the supply of air therethrough. When necessary to secure the maximum operation of the apparatus or when desirable for other reasons this refuse may be removed by simply removing the plates 23 and chambers 14 from the compartments 9 and 10 and subjecting them to a thorough and complete cleansing. With this arrangement it is thus a simple matter to keep the perforations at all times free and clear for the passage of the air and for sanitary reasons so that the process may always be carried on under the most satisfactory conditions. My apparatus in consequence makes it absolutely certain that the oysters or the like after being treated will be safe to eat and to preserve for a maximum length of time without danger to the ultimate consumer.

It will of course be apparent that in some cases the flat plates 23 may be omitted from the apparatus and also that the partition 11 may sometimes be left out in which case a single chamber 14 of a size to properly fit the tank 5 would be used. In other instances the chambers 14 may be replaced by the chambers 14ª shown in Fig. 5. The said members 14ª are provided with an exterior flat horizontal or major outer surface and with an interior corrugated surface as clearly shown, the said members 14ª being otherwise the same and operating the same as the chambers 14. The plates 23 may be used or may be omitted when the members 15ª are utilized as may be found most advisable.

The separate compartments shown in the illustrated example of my apparatus, being independently controlled as to air supply, etc., may be coincidentally used for treating different materials in different ways without interference. That is a material requiring for instance a violent treatment may be treated in one compartment while at the same time another material requiring for instance a mild treatment may be treated in the other compartment. My improvement thus provides for the treatment of vegetables, fruits, oysters and the like in a manner to improve their condition and further provides a simple apparatus for efficiently carrying out said treatment.

Various changes in the specific form shown and described may be made within the scope of the claims without departing from the spirit of my invention.

Some types of oysters when treated as above generate a large amount of foam in which case it is preferable to use the overflow trough shown in Fig. 6. These troughs simply comprise elongated funnels 7ª having a width corresponding substantially to that of the tank and being provided with hooks 7ᵇ whereby said troughs may be properly suspended on the tank 5 at the end thereof. The said funnels 7ª are open at the top and bottom and preferably have their upper ends inclined upwardly as shown. Thus when the foam generated is to be removed, it is simply scraped from the surface of the water in the tank 5 into said funnels 7ª by means of a paddle or the like and passes out through the same as will be clearly apparent. Instead of the troughs 7 or funnels 7ª the outlet pipes 8 may be directly connected with the apertures 6 if desired.

While I have described my improvement specifically in connection with oysters and the like it is to be distinctly understood that this is only an example and that the same is equally well adapted for use as an efficient washing apparatus in many other connections as will be readily apparent.

I claim:

1. An apparatus for treating food stuffs comprising a container for a liquid in which said food stuffs are immersed, a removable air compression chamber in said container comprising a continuous and endless side wall and a transverse wall connected with said continuous and endless side wall throughout, said compression chamber being provided with perforations whereby air is distributed to said liquid and means for introducing air into said compression chamber.

2. An apparatus for treating food stuffs comprising a container for a liquid, in which said food stuffs are immersed, a member located in said container at a distance above the bottom thereof, and means for introducing air under pressure into said container and beneath said member, the latter being provided with perforations having their outlet ends arranged at an angle to the vertical whereby said air is distributed to said liquid in jets which extend at angles to each other.

3. An apparatus for treating food stuffs comprising a container for a liquid, in which said food stuffs are immersed, a dished member removably located at the bottom of said container in an inverted condition to form an inclosed chamber, said member having a corrugated surface, and means for introducing air under pressure into said chamber and beneath said member, the latter being provided with perforations whereby said air is evenly distributed to said liquid.

4. An apparatus for treating food stuffs comprising a container for a liquid, in which said food stuffs are immersed, a removable corrugated dished member located at the bottom of said container in an inverted condition to form an inclosed chamber, said member having perforations in the corrugations, the outlet ends of which are arranged at an angle to the vertical, a removable foraminated element in said container at a distance above said member and means for introducing air into said inclosed chamber and through said perforations and foramina.

5. An apparatus for treating food stuffs comprising a container for a liquid, in which said food stuffs are immersed, said container having an exit opening, a door for normally sealing said opening, a removable, perforated, dished member located at the bottom of said container in an inverted condition to form an inclosed chamber, a removable foraminated element located in said container at a distance above said member and inclined downwardly toward said exit opening and means for introducing air into said chamber and through said perforations and foramina.

6. An apparatus for treating food stuffs comprising a container for a liquid, in which said food stuffs are immersed, a removable perforated member located in said container and forming an inclosed chamber at the bottom thereof, a foraminated element in said container at a distance above said member and means for introducing air into said chamber and through said perforations and foramina.

7. An apparatus for treating food stuffs comprising a container for a liquid, in which said food stuffs are immersed, a channeled member located in said container at a distance above the bottom thereof and provided with perforations terminating in the longitudinal walls of said channels and having their outlet ends arranged at an angle to the vertical and means for introducing air into said container beneath said member and through said perforations.

8. An apparatus for treating food stuffs comprising a container for a liquid, in which said food stuffs are immersed, a channeled member located in said container at a distance above the bottom thereof and provided with perforations located in said channels above the bottom thereof and means for introducing air into said receptacle beneath said member and through said perforations.

9. An apparatus for treating food stuffs comprising a container, a partition dividing said container into separate compartments, adapted to contain a liquid in which said food stuffs are immersed, a perforated member in each compartment at a distance from the bottom thereof, means for introducing air beneath each perforated member and through the perforations thereof, and means for independently controlling the supply of air beneath each member.

In testimony whereof I have hereunto set my hand in the presence of two subscribing witnesses.

GEORGE B. FURMAN.

Witnesses:
JOHN A. KEHLENBECK,
FRITZ ZIEGLER, Jr.